Oct. 13, 1964  E. R. VAN KREVELEN ETAL  3,153,230
TERRAIN CLEARANCE SYSTEM
Filed June 2, 1959  6 Sheets-Sheet 1

*INVENTORS*
EDWARD R. VAN KREVELEN
NORMAN G. HORNING
BY
*Kenneth D. Olsen*
ATTORNEY Oct. 13, 1964   E. R. VAN KREVELEN ETAL   3,153,230
TERRAIN CLEARANCE SYSTEM
Filed June 2, 1959   6 Sheets-Sheet 2

INVENTORS
EDWARD R. VAN KREVELEN
NORMAN G. HORNING
BY *Kenneth D. Ohm*
ATTORNEY

INVENTOR.
EDWARD R. VAN KREVELEN
NORMAN G. HORNING
BY Kenneth D. Ohm
ATTORNEY

FIG. 7

INVENTORS
EDWARD R. VAN KREVELEN
NORMAN G. HORNING
BY
*Kenneth D. Ohm*
ATTORNEY

TYPICAL PHANTASTRON WAVE FORMS

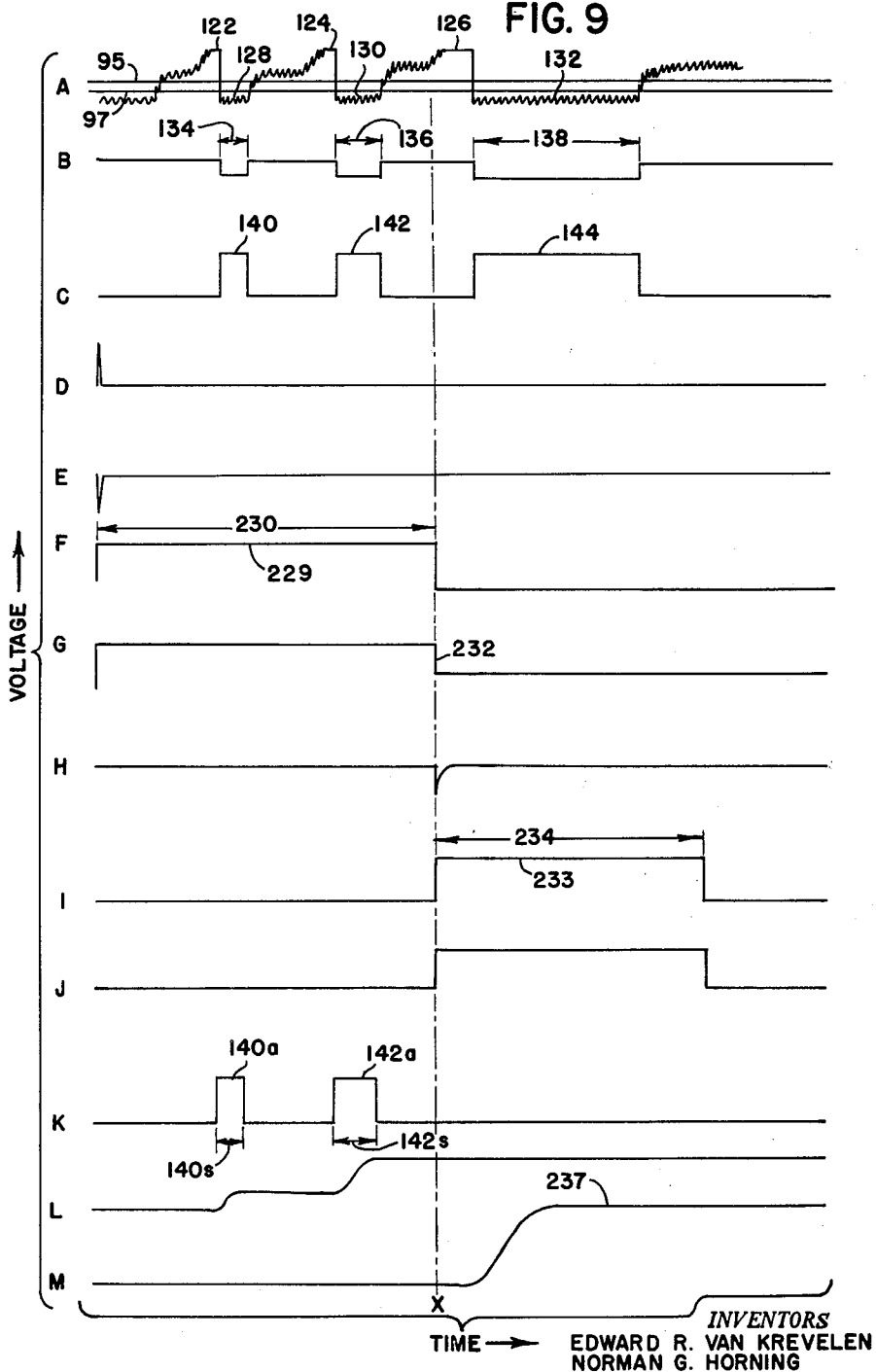

United States Patent Office 3,153,230
Patented Oct. 13, 1964

3,153,230
TERRAIN CLEARANCE SYSTEM
Edward R. Van Krevelen and Norman G. Horning, Minneapolis, Minn., assignors, by mesne assignments, to Litton Systems Inc., Beverly Hills, Calif., a corporation of Maryland
Filed June 2, 1959, Ser. No. 817,673
23 Claims. (Cl. 343—5)

The invention relates generally to airborne radar apparatus. More particularly, the invention is concerned with a novel terrain clearance system which may be used in conjunction with conventional radar sets for determining when an aircraft is traversing a dangerous course which, if continued, might well result in a collision with an obstacle projecting upwardly from the ground.

When an airborne radar set having a fan beam antenna pattern is flown at low altitudes above the surface of the earth, there are usually "shadows" in the radar display caused by geographical features which shut off the radar pattern from all targets in the "shadow" areas behind them. Such shadows are caused by obstacles which are of the order of magnitude of one beam width or wider. At long and short ranges the shadow for a large obstacle is defined clearly. For a small obstacle, the sensitivity, that is the capability of detecting a shadow cast thereby, increases greatly as the radar approaches the obstacle. Broadly, the present invention comprehends the production of a signal having a function or characteristic representative of the length of each obstacle shadow that may be present. By determining whether the function or characteristic imparted to the signal is equal to, less than, or more than a predetermined function or characteristic for a given shadow, or for a plurality of such shadows, it can be ascertained if the aircraft is following a safe or dangerous path with respect to the obstacle casting that particular shadow or the various shadows where more than one obstacle is involved.

Accordingly, one object of this invention is to provide a system capable of determining from the shadows cast by obstacles whether an aircraft is following a safe course.

Another object is to provide a small, lightweight airborne electronic instrument which may be used with conventional radar sets to provide warnings of terrain obstacles which lie in the intended path of an aircraft.

Another object of the invention is to provide an instrument of the foregoing character that is connectible to the radar set through existing or easily obtained facilities and does not require modification of the radar system.

Another object of the invention is to provide a terrain clearance system that may be used in combination with conventional airborne radar and which provides warnings of terrain obstacles in the intended path of the aircraft while the aircraft radar is scanning.

A further object is to provide a terrain clearance system capable of simultaneous warnings of terrain obstacles in both the intended aircraft flight path and the entire field viewed by the radar system. That is, it is the aim of this invention to provide a system which warns of all collision courses and provides information relative to the safety of alternate courses for a complete 360° azimuth circle about the aircraft.

A still further object of the invention is to provide a terrain clearance system for automatically analyzing the shadow content by electrical means within a predetermined range and sounding an alarm or control mechanism whenever the shadow content exceeds a predetermined value.

Other objects and advantages of the invention will be apparent from the following description in which certain preferred embodiments of the invention are disclosed. In the drawings which form a part of this application, FIGURE 1 shows the paths of certain radar signal returns to an aircraft flying toward a plurality of obstacles;

FIGS. 6 and 7, when placed end to end, is a combined schematic diagram of the circuit of the preferred embodiment of the invention, said diagram showing the components of the terrain clearance system used in conjunction with a radar set;

FIG. 9 shows the voltage-time characteristics of the signals appearing in specific portions of the circuitry set forth in FIGS. 6 and 7.

The operation of the present invention is based on the existence of shadow (no echo return) lengths behind upwardly projecting obstacles or targets and the actual return from the obstacles and the approach thereto. That is, an obstacle in the path of a transmitted radar signal will prevent the return of a signal to the radar set from certain areas lying on the opposite side of said obstacle from said radar set but will not prevent said returns from regions in between said set and said obstacle.

Figure 1:
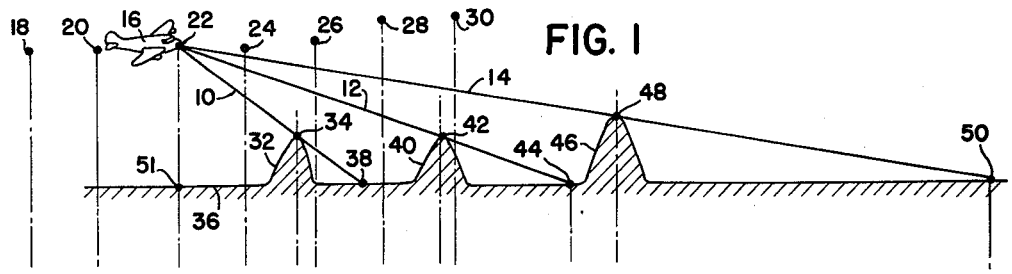

For ease of explanation, FIG. 1 pictures exemplary grazing radar signal paths 10, 12, and 14 from a very narrow beam radar in an aircraft 16 flying over terrain which has a profile as shown in this figure in the plane of the radar beam. The dots 18, 20, 22, 24, 26, 28, and 30 indicate a possible flight path of the aircraft 16. With the aircraft 16 at point 22, the grazing radar path 10 touches an obstacle 32 at point 34 and the earth 36 at point 38 on the far side of said obstacle. Similarly, with the aircraft 16 at point 22, the grazing radar paths 12 and 14 touch obstacle 40 at point 42 and the earth 36 at point 44 and obstacle 46 at point 48 and the earth 36 at point 50, respectively.

Figure 2:
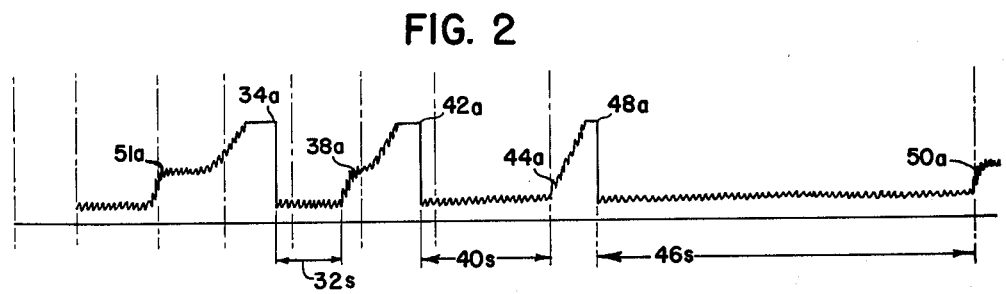
FIG. 2 illustrates a voltage-time characteristic or "A" scope signal derived from the radar return for terrain having an irregular profile as shown in FIG. 1.

For a given transmitted narrow beam radar pulse or signal, a return signal (FIG. 2) caused by terrain with an irregular profile as indicated in FIG. 1 as said transmitted signal proceeds along the terrain from a point 51 immediately beneath the aircraft to the crest 34 of the obstacle 32 of FIG. 1 is continuous and there are echo returns (see portion of FIG. 2 between numerals 51a and 34a). Beyond the point or crest 34, because of the absence of additional terrain of sufficient altitude between the obstacle 32 and the point 38 to reflect the radiated energy of the transmitted pulse, the return signal (FIG. 2) due to terrain ceases and there are no echo returns, i.e., there is a shadow, for a certain time interval (see portion of FIG. 2 between numerals 34a and 38a, the irregularities in this portion being receiver noise). With the presence of terrain at point 38 of FIG. 2 the particular transmitted pulse can again "see," and the return signal of FIG. 2 caused by the terrain of FIG. 1 as said transmitted signal proceeds along the terrain from point 38 to the crest 42 of the obstacle 40 is again continuous and there are again echo returns (see portion of FIG. 2 between numerals 38a to 42a). Beyond this crest 42, because of the absence of terrain of sufficient altitude between the obstacle 40 and the point 44 to reflect the energy of said transmitted pulse, the return signal (FIG. 2) again ceases for a certain time interval. (See portion of FIG. 2 between numerals 42a and 44a. The irregularities in this portion are due to receiver noise.) Similarly, as said transmitted signal proceeds along the terrain of FIG. 1 from point 44 to point 50, there are echo returns (see the portion of FIG. 2 between numerals 44a and 48a) for the terrain between points 44 and 48 and no echo returns, i.e., shadow (see the portion of FIG. 2 between numerals 48a and 50a. The irregularities in this portion are receiver noise) for the terrain between points 48 and 50.

Figure 3:
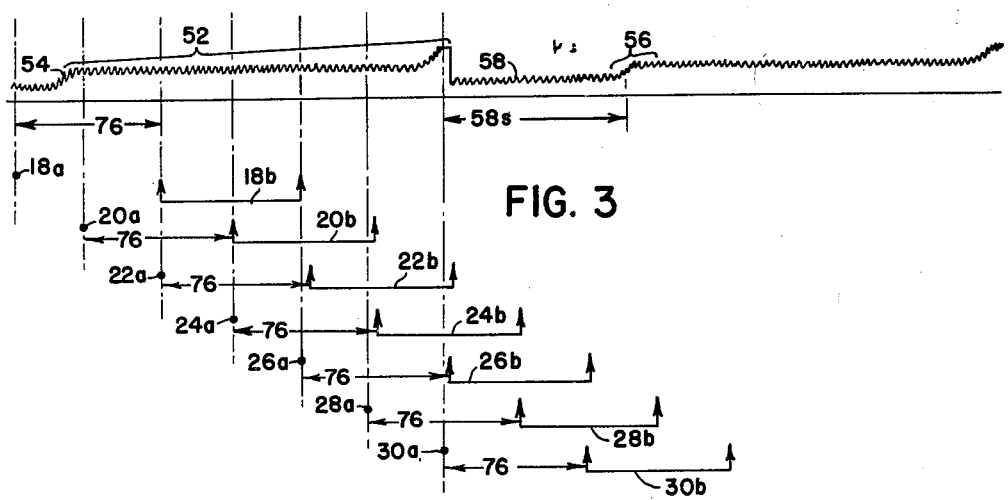
FIG. 3 illustrates voltage-time characteristics of the radar return for one obstacle of FIGURE 1 as the aircraft approaches said obstacle.

Thus for a given narrow beam radar pulse, the return therefrom from one obstacle resembles portion 52 of a curve denoted generally by the numeral 54 in FIG. 3 as the radar beam approaches a grazing path similar to either paths 10, 12, or 14. As this transmitted radar pulse continues past one of said grazing paths, the return signal for said transmitted pulse appears like portion 56 of curve 54. In between portions 52 and 56 there is a portion 58 of no echo return that has a length 58s which is dependent upon the time interval between the end of echo return 52 and the start of echo return 56. In the case of the grazing path 10, the length of this no echo return portion like 58s is indicated by 32s of FIG. 2 and is proportional to the distance $\overline{34\ 38}$. Similarly for grazing paths 12 and 14 there are no echo return signals like portion 58 the lengths of which are indicated by 40s and 46s respectively and which are proportional to distances $\overline{42\ 44}$ and $\overline{48\ 50}$, respectively. The time span of these no echo return portions is indicative of the heights of the objects which cause them and proportional to the length of the shadow (no echo) areas behind said obstacle.

As previously stated, the return from one obstacle resembles curve 54 of FIG. 3. That is, the video output of a radar receiver in an aircraft like 16 for one obstacle appears like curve 54 with the length 58s of the no echo return or shadow portion 58 being directly proportional to the height of the obstacle which caused said shadow portion. This portion 58 which is indicative of the length of shadow cast by a given object is the fundamental quantity used in the terrain clearance system. The comparison of this portion 58 within a given range with a predetermined quantity provides information relative to whether the aircraft, if it continues on its present course, will collide with or pass above by a predetermined distance the obstacle from which said portion was derived. In the preferred embodiment of this invention this comparison is accomplished for only a relatively small segment or gated portion like 18b of FIG. 3 of the return for any given transmitted radar pulse, i.e., only a small portion of the return between the arrows of 18b is analyzed for shadow content. The manner of gating will not at the moment be understood but will be made manifest as the description progresses. The shadow content of said gated portion is measured, and if this shadow content is greater than some predetermined value (preferably approximately 90% of the gated portion), an alarm is sounded.

An explanation of how and why the analyses of a segment or portion like 18b of the return from a transmitted radar pulse will be more readily understood by reference to FIGS. 1 and 3. As the aircraft 16 of FIG. 1 moves from position 18 to positions 20, 22, 24, 26, 28, and 30 in turn, the gated portion between the arrows of 18b, 20b, 22b, 24b, 26b, 28b and 30b of radar return which is analyzed for said positions 18, 20, 22, 24, 26, 28, and 30, respectively, remains at a predetermined range from said aircraft as illustrated by numerals 76 on lines 18a through 30a of FIG. 2. By range is meant the distance along the terrain from a point immediately below the aircraft out to a first point along the terrain between which points for ease in explaining the operation of this invention let it be assumed the shadow content is not analyzed. The distance from said first point to a second point along the terrain between which points the shadow content is analyzed is the length of the aforementioned gated portion. The length is adjustable. Preferably, the range from the aircraft will be 10 miles and the length will extend an additional 15 miles, i.e., the gated portion will begin 10 miles from the aircraft and end 25 miles from the aircraft. As can be seen in FIG. 3 the video content of the gated portions of the returns from the obstacle which creates shadow portion 58 as the aircraft moves from position 18 to 22 is entirely without shadow. As the aircraft moves on to position 24 shadow portion 58 enters the gated portion. The shadow portion 58 will exceed the predetermined value (for example 90%) of the width of the gated portion shortly thereafter when the aircraft is somewhere between positions 24 and 26. When this occurs, an alarm will be sounded, which happening will be explained in detail hereinafter.

With the sounding of the alarm the aircraft should be placed in an attitude of climb. The alarm will continue until the aircraft has attained an altitude which allows the radar to receive a return from the terrain beyond the obstacle (see, for example, gated return 28b for aircraft position 28) and when said return occupies approximately 10% of the gated portion of the radar video return (which is just prior to the aircraft reaching position 28) the alarm ceases and the aircraft can be safely levelled.

When a pilot becomes aware of an alarm, he places his aircraft into an attitude of climb which he assumes will allow him to clear the obstacle which actuated the alarm. He can not be certain of this, however, without knowing the actual height of the obstacle, and he may proceed on a collision course even in an attitude of climb. To provide additional safety, a short range alarm (adjustable in the preferred embodiment from one to ten miles to analyze, for example, the return signals caused by the terrain between a point along the terrain closer to the aircraft than the point at which the previously mentioned gated portions begin and said point at which said gated portions begin for shadow content) is included in the system. If this short range alarm is actuated, then the probability that the rate of climb will not allow the pilot to clear the obstacle is much greater, and the selection of an alternate safe aircraft heading should be made.

The selection of a safe alternate heading is facilitated by this invention in the following way since no echo return or shadow portions like 32s, 40s, and 46s of FIG. 2 will appear on a PPI scope, FIG. 4, as an aircraft flies over terrain such as shown in FIG. 1. The small area between lines 60 and 62 is that viewed by a single narrow beam radar pulse. The white spots 64, 65, 66 depict obstacles such as 32, 40, and 46 of FIG. 1 and the dark areas 70, 72, and 74 are the shadows which cause portions 32s, 40s, and 46s of FIG. 2 cast by these respective objects. The other white spots 67, 68, and 69 on the PPI scope, FIG. 4, also depict obstacles. If any of these obstacles 67, 68 and 69 are potentially dangerous, i.e., if the aircraft continued at its present altitude or lower and went toward any one of them it would collide with or fail to clear said one obstacle by a desired distance, the present invention creates a marker line 71 on the PPI behind said potentially dangerous obstacles. Thus only in the directions represented by the marker line 71 is there danger. Therefore a safe course would be in any direction represented by the lack of the marker line 71 (for example to the right of an azimuth heading of 0° to a heading somewhere between approximately 15° and 55°).

Figure 5:
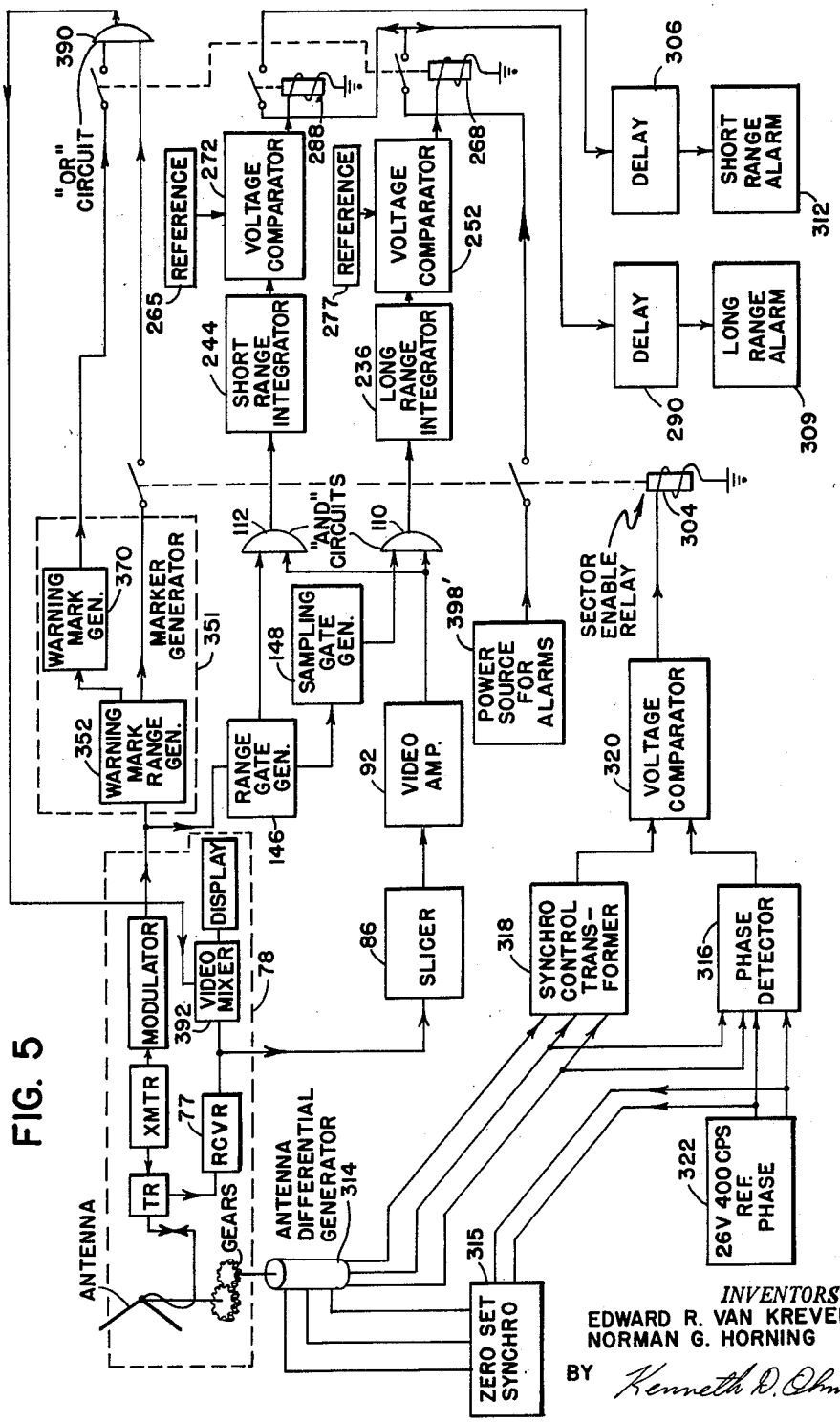
FIG. 5 is a block diagram of the terrain clearance system in combination with a conventional airborne radar set.
Figure 6:
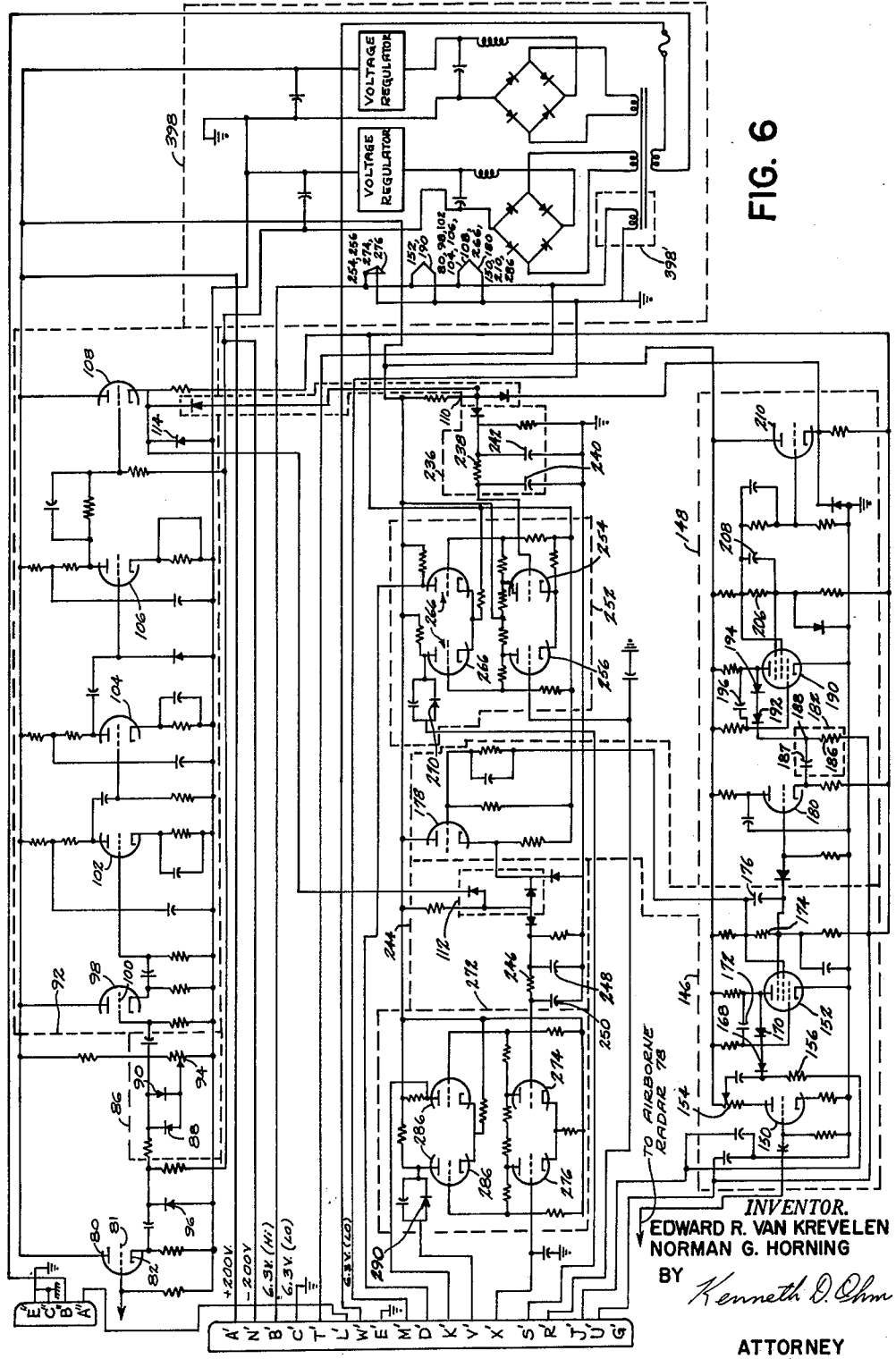

The detail theory of operation of the shadow width terrain clearance adapter will be presented after the various elements which comprise said adapter set forth in FIGS. 5, 6, and 7 are described. Referring now to the details of the circuit, attention is first directed to FIG. 5 where a receiver 77 belonging to a conventional airborne radar set labeled 78 is shown. The receiver output, depicted schematically in FIG. 6, is coupled to a triode 80. The triode 80 has a grid 81 and a cathode 82. The grid 81 of the triode 80, therefore, has impressed thereon the return video signals like FIG. 2 from the radar set 78. Connected to the cathode 82 of the triode 80 through a resistor 84 is a slicing circuit 86 for removing what amounts to an intermediate voltage strip from curve A of FIG. 9, as will presently be explained somewhat more fully. The slicing circuit 86 contains slicing diodes 88 and 90 connected back to back between a video amplifier 92 and a voltage source provided by a bias potentiometer 94. A diode 96 electrically associated with the cathode 82 prevents the output signal of the triode 80 from going negative. Thus, in a well known fashion a slice or voltage strip between the voltage levels 95 and 97 of signal A (FIG. 9) is made available.

The video amplifier 92 includes a triode 98 connected as a cathode follower. The triode 98 has a grid 100. The output, that is the sliced signal between levels 95 and 97, from the slicer 86 is applied to the grid 100. The video amplifier 92 also contains three triode tubes 102, 104, and 106 which comprise a three stage amplifier. These tubes 102, 104, and 106 are connected in a manner well known in the art. They increase the signal level and improve the wave form of the sliced video signal.

A triode 108 connected as a cathode follower is connected to the output of the tube 106. This tube 108 is connected to "and" circuits 110 and 112. A diode 114 is connected to the cathode of the triode 108.

As previously stated, for a given transmitted radar pulse there will be a return signal (FIG. 2) caused by terrain with a profile as indicated in FIG. 1. To aid in discussing the operation, FIG. 2 has been reduced slightly in width and now appears as curve A of FIG. 9. In curve A the high spots 122, 124, and 126 indicate obstacles 32, 40 and 46 of FIG. 1 lying in the path of the narrow beam transmitted signal, and the low portions 128, 130, and 132 are representative of the length of "shadow" caused by the obstacles 32, 40 and 46, respectively. The irregularities in the low portions 128, 130 and 132 are due to receiver noise. The signal, curve A, from the radar receiver 77 is applied to the grid 81 of the triode 80. The output of triode 80 is very similar to curve A. This output is applied to the slicing diodes 88 and 90. The forward drop across said diodes is about one volt. Because of this and with proper adjustment of the potentiometer 94, a one volt slice (for example between the lines 95 and 97 of curve A) can be taken out of the video signal curve A, i.e., the output of tube 80, between the zero and three volt level. Such a slice gives a signal like curve B of FIG. 9. In curve B widths 134, 136, and 138 which represent time spans are representative of the lengths of shadows 128, 130, and 132, respectively. The diode 96 clamps the signal from the cathode follower 80 and prevents said signal from going negative. This clamping action establishes the D.C. level which references the video signal to the positive bias provided by the resistor 94.

The sliced video signal, curve B, is applied to cathode follower 98 of the video amplifier 92 and thus to the three stage amplifier comprised of tubes 102, 104, and 106. This three stage amplifier increases the signal level of the sliced video signal and improves its wave form. The output of tube 106 of the three stage amplifier is applied to the grid of the cathode follower connected triode 108 and said triode, in turn, applies signals like curve C to the "and" gates 110 and 112.

The diode 114 prevents the cathode of tube 108 from going negative even though said cathode is referenced to a minus 200 volt supply. The wave form of the cathode of the tube 108 which, incidentally, is similar to the wave form of the output of the video amplifier 92 is a rectangular wave form like curve C of FIG. 9 in which the shadow content of the radar video signal is indicated by raised portions 140, 142, and 144. The time interval during which portions 140, 142 and 144 persist is indicative of the height of the obstacle which caused said portions. In the preferred embodiment, the curve C varies in amplitude from zero to approximately 50 volts.

The modified video signals, curve C, from the triode 108 are impressed upon one input of each of the "and" circuits 110 and 112. The other input of the "and" circuit 112 is actuated by signals from a range gate generator 146 while the other input of the "and" circuit 110 is actuated by signals from a sampling gate generator 148.

The range gate generator 146 which is coupled to the airborne radar 78 includes a triode 150 and a screen coupled monostable phantastron circuit which includes a pentode 152 connected in a well known manner with the following elements. These elements include a resistor 154 in the plate circuit of the tube 150. Electrically associated with the resistor 154 is a resistor 156 and a selective range gate generator control 159 (see FIG. 7) having a switch 160. The switch 160 has three contacts which when properly positioned place resistors 162, 164, and 166 respectively in series with the resistor 156. The line connecting the resistor 154 and the resistor 156 is linked to the plate of the pentode 152 by a pair of series connected diodes 168 and 170. Also connected to the plate of pentode 152 is a capacitor 172. The side of the capacitor 172 which is not connected to the plate of the pentode 152 is linked to the grid of said pentode. The screen and suppressor grid of the pentode 152 are connected to each other by the parallel combination of a resistor 174 and a capacitor 176. The screen side of the parallel combination of the resistor 174 and capacitor 176 is connected to the grid of a triode 178 connected as a cathode follower. The cathode of the tube 178 is connected to the second input of the "and" gate circuit 112.

The junction of the aforesaid parallel combination of the resistor 174 and the capacitor 176 which is connected to the suppressor of the pentode 152 is connected to the grid of the tube 180. Tube 180 is one of the elements which makes up the sampling gate generator 148. The cathode of tube 180 is joined to a differentiating circuit 182 comprised of a capacitor 184 and a resistor 186, which are series connected. The common junction 188 between the capacitor 184 and the resistor 186 is coupled to the plate of a pentode 190 through series connected diodes 192 and 194. The pentode 190 is connected in a well known manner to make up a phantastron circuit. The plate of the pentode 190 is linked to its grid through a capacitor 196.

The end of the resistor 186 which is not connected to the juncture 188 is coupled to a selective sampling gate generator control 197 having a switch 198. Connected to various terminals of the switch 198 are resistors 200, 202, and 204. The switch 198 is connected to a positive voltage supply through said resistors. The screen and the suppressor grid of the pentode 190 are connected through the parallel combination of a resistor 206 and a capacitor 208. The screen end of this parallel combination is linked to the grid of a triode 210. The cathode of triode 210 is connected to the second input of the "and" gate circuit 110.

In operation, the range gate generator 146 and the sampling gate generator 148 supply signals to the "and" gate circuits 112 and 110, respectively, in the following manner. With the emission of a narrow beam transmitted radar pulse from the airborne radar 78, a signal like curve D of FIG. 9 is impressed upon the grid of the tube 150. This signal, curve D, produces a negative going synchronizing pulse, like curve E, at the plate of the tube 150. The negative going synchronizing pulse of curve E is coupled to the plate circuit of the pentode 152 of the range gate phantastron circuit through the diodes 168 and 170.

Figure 8:
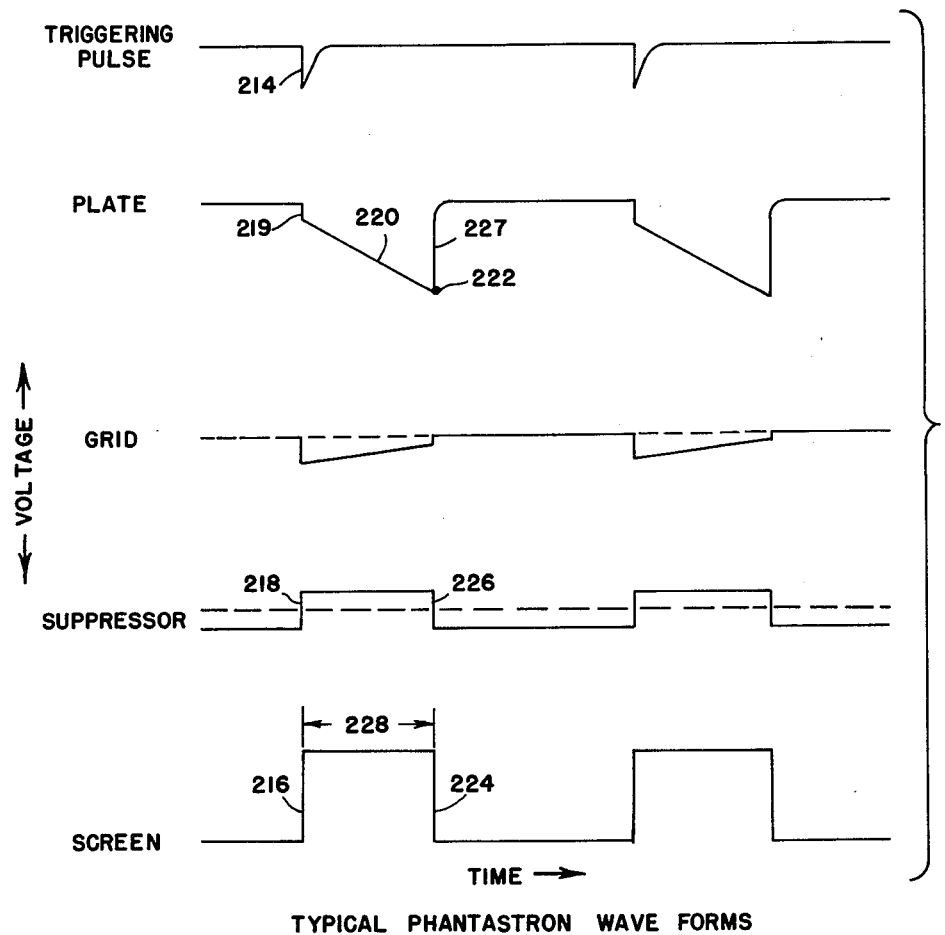
FIG. 8 shows the voltage-time characteristics of the signals appearing in the circuits of the preferred embodiment of the invention.

The circuit action of the phantastron circuit is similar to a Miller rundown circuit, except that the suppressor gate is taken from the screen grid network of the pentode 152. FIG. 8 illustrates typical phantastron wave forms created in the various circuits of a phantastron circuit connected like pentode 152 when a negative trigger pulse like curve E of FIG. 9 is coupled to the plate of the pentode. The pentode plate current is normally held cut off by the suppressor bias, so that all cathode current is absorbed by the screen grid. When the negative going synchronizing pulse, curve E, is coupled to the pentode plate, it provides a negative triggering pulse, 214 of FIG. 8, at said plate which is transferred to the control grid of the pentode by the capacitor 172. This decreases the cathode current of the pentode and allows the screen grid potential thereof to rise. (See portion 216 of screen voltage curve of FIG. 8.) Since the suppressor of the pentode is on the same bleeder network as the screen grid, the suppressor grid voltage also rises (see portion 218 of suppressor voltage curve of FIG. 8) and the plate current begins to flow thereby causing the plate voltage to fall (see portion 219 of plate voltage of FIG. 8). The suppressor grid voltage rise 218 causes a further drop in the screen current. This further screen current drop causes a further rise in the screen and suppressor grid voltages 216 and 218 and a further rise in the plate current which causes the plate voltage 219 to fall further. This effect is regenerative, and the rise in screen voltage 216 is very fast.

At the same time that the screen voltage is rising, the plate voltage rundown circuitry 220 starts and continues until bottoming takes place, whereupon the control grid of the pentode 152 goes slightly positive and the cathode current increases. The increased cathode current increases the screen current slightly, causing the screen voltage to drop (see portion 224 of screen voltage curve FIG. 8), and consequently, a drop 226 in the suppressor grid voltage which tends to decrease the plate current which causes the plate voltage 227 to rise. Here again, the effect is regenerative and the screen voltage drops readily (see portion 224 of the screen voltage wave form illustrated in FIG. 8). The output of the pentode 152 is taken from the screen bleeder. This output pulse follows the general wave form of the screen voltage illustrated in FIG. 8. This output pulse has a width 228 which is controlled by setting the level at which the plate rundown of the pentode 152 of the phantastron circuit starts. In the case of pentode 152, this level is established and controlled by resistors 162, 164, or 166, depending upon the position of the switch 160.

In the preferred embodiment of this invention, the value of the potentiometers 162, 164, or 166 which are placed in circuit with the resistor 156 by the proper positioning of the switch 160 will be chosen so the width, i.e., the time span of the output pulse 229 of the phantastron circuit associated with the pentode 152 is as depicted by numeral 230 of curve F of FIG. 9. Depending upon the position of switch 160, the amount of selected control voltage fed to the plate of the pentode 152 through the isolating resistor 156 and the diodes 168 and 170 can be controlled. The value of this selected control voltage determines when the plate rundown like numeral 220 of plate voltage characteristic of FIG. 8 of the phantastron circuit of pentode 152 starts and therefore the width 230 of its output 229. This width 230 is an indication of the time during which pentode 152 has an output. The output, curve F, of the pentode 152 is applied to the grids of the two cathode follower connected triodes 178 and 180. The output of the cathode follower connected triode 178 due to the curve F impressed upon its grid looks generally like curve G and its time interval is the same as that of curve F. This output of the triode 178 is applied to one input of the "and" gate circuit 112. The output of tube 180 also appears generally like the curve G and its time interval is also the same as that of curve F. This output of triode 180 drives the sampling gate phantastron circuit of pentode 190 in the following manner. It is differentiated by the differentiator circuit 182. The output of the differentiator circuit 182 appears like curve H and is coupled to the plate circuit of the pentode 190 of the sampling gate phantastron circuit through diodes 192 and 194. Thus, the sampling gate phantastron circuit of pentode 190 which works in the same manner as the range gate phantastron circuit of the pentode 152 is triggered by the trailing edge 232 of the pulse 230 which is produced by the range gate phantastron circuit. As previously explained in the discussion of the operation of the phantastron circuit of pentode 152 the width of a phantastron output pulse is controlled by setting the level at which its pentode plate rundown starts. In the case of the phantastron circuit of the pentode 190, this level is established by potentiometers 200, 202, or 204, depending upon the position of switch 198.

For the purpose of further discussion of the operation of this invention, it will be assumed that the width of the output pulse 233 of phantastron circuit of the pentode 190 is as shown by numeral 234 of curve I. The width 234 of this output pulse 233 determines the length of the long range sampling interval. In the preferred embodiment of this invention the long range sampling interval begins at the end of the short range sampling interval, i.e., the output of the sampling gate generator 148 starts when the output of the range gate generator 146 ends. The output, curve I, of the phantastron circuit of pentode 190 is fed to the grid of the cathode follower connected triode 210, which in response to the positive going portion 233 thereof produces an output curve J which is applied to the second input of the "and" circuit 110.

Connected to the output of the "and" circuit 110 is a long range integrator circuit 236. The long range integrator circuit 236 is a simple resistance-capacitance "pi" network consisting of a resistor 238 and capacitors 240 and 242.

A short range integrator circuit 244 is connected to the output of the "and" circuit 112. This integrator circuit 244 is a simple resistance-capacitance "pi" network including a resistor 246 and two capacitors 248 and 250.

When the output signals like portions 140 and 142 of curve C appear at the video amplifier 92 output at the same time that a signal like curve G appears at the output of the range gate generator, a signal like curve K will be passed by the "and" gate circuit 112 to the short range integrator 244. The widths 140s and 142s of the raised portions 140a and 142a of curve K represent the shadow lengths 134 and 136 caused by the same objects responsible for the raised portions 122 and 124 of curve A. With the input to the short range integrator 244 like curve K the output will be a D.C. voltage like curve L, the level of which corresponds to the shadow content of the portion of the video signal curve A between time=0 and time=X.

The long range integrator 236 operates in substantially the same manner as the short range integrator 244 in that when a signal like curve J exists at the same time a signal like portion 144 of curve C from the video amplifier 92 exists, said integrator will produce a D.C. voltage (see curve M) similar to curve L which corresponds to the shadow content of that portion 132 of the video signal A which caused said raised portion 144.

Connected to the output of the long range integrator 236 is a long range voltage comparator 252. The long range voltage comparator 252 is a high gain, direct coupled, differential amplifier employing a special low-drift tube with balanced halves 254 and 256. The grid of half 254 is directly coupled with the output of the long range integrator 236. The grid of half 256 is linked to a positive 200 volt source through a selective reference control 277 having potentiometers 280, 282, or 284 and a switch 278 (see FIG. 7).

The plates of the halves 254 and 256 are directly coupled to the grids of a duo-triode relay tube 266. An alarm relay 269 is connected between the plates of the relay tube 266. A diode 270 is in series with the alarm relay 268.

A short range voltage comparator including a high gain, direct coupled, differential amplifier employing a special low-drift tube with balanced halves 274 and 276 is directly coupled to the output of the short range integrator 244. The output of the integrator 244 is directly connected to the grid of half 274. The grid of half 276 is linked to a voltage supply of +200 v. by a selective reference control 265 having a switch 264 and resistors 258, 260, or 262 (see FIG. 7).

The plates of the low-drift tube halves 274 and 276 are directly coupled to the grids of the duo-triode relay tube 286. An alarm relay 268 and a diode 290 are connected in series between the plates of the relay tube 286.

The operation of both the long and short range voltage comparators 252 and 272 is quite similar. Therefore, only the operation of the long range voltage comparator will be discussed here. The output of the long range integrator 236, which is a D.C. voltage, the magnitude of which depends upon the length of the shadows gated or passed to said integrator, is applied to the grid of the half 254 of the low-drift tube. In the preferred embodiment this voltage varies from zero to plus 20 volts.

A voltage is also supplied to the grid of tube half 256. The value of this voltage is controlled by switch 278 since the position of said switch determines which of the potentiometers 280, 282, or 284 will be placed in circuit between the positive voltage source and the grid of half 256. The voltages established by the potentiometers 280, 282, and 284 are equal to the long range integrator 236 output voltages such as indicated by 237 of curve M of FIG. 9 for various total lengths of shadow occurring within a sampling interval such as the raised portion of curve J of FIG. 9. That is, the voltages established by the potentiometers 280, 282, and 284 can be made to equal predetermined percentages of the long range integrator voltage which would be produced if the sampling gate like the raised portion of J were completely filled with shadow. The aforementioned percentages are adjustable internally between zero and 100% of the gate width and are selected as a function of the clearance altitude desired.

As the plates of the halves 254 and 256 are directly coupled to the grids of the duo-triode relay tube 266, any difference in voltage occurring in said plates will be amplified and appear as a larger difference between the plates of tube 266. This difference will cause current to flow through the relay 268 of FIG. 7, and thereby actuate it. The diode 270 in series with the alarm relay 268 permits current to flow only in one direction. Therefore, the alarm relay 268 only closes when the voltage fed to the grid of half 254 from the long range integrator 236 exceeds the reference voltage applied to the grid of tube half 256.

The short range comparator 272 with its control switch 264 and associated resistors 258, 260, and 262, and duo-triode 236 and relay 288 operates in substantially the same manner as the long range comparator 252.

When relays such as 268 and 288 are activated it means that an aircraft like 16 will not clear by a predetermined desired distance some obstacle in the path of the transmitted narrow beam radar pulse. To be of use, this information must be made available to those who control the aircraft. Therefore, this invention provides a number of alarm circuits which will now be described in some detail.

Contact 268R1 of the long range alarm relay 268R of FIG. 7 is connected to the input of a long range delay 290. The delay 290 includes a triode 292, a resistor 294, a capacitor 296, a resistor 297 and a resistor 299. The resistors 297 and 299 are connected in series between ground and a negative potential of —200 v. The resistor 294 is connected in parallel with the capacitor 296 with said parallel combination being connected between the grid of the tube 292 and the juncture between the resistors 297 and 299. The grid of the tube 292 is coupled to contact 268R1 of relay 268R. Between a positive voltage source of 200 v. and ground are resistors 298 and 300 connected in series. A capacitor 302 is connected in parallel with the resistor 298. The common juncture of the resistors 298 and 300 is connected to contact 304R3 of an enable relay 304R. Contact 304R1 of the enable relay 304R is connected to contact 268R3 of relay 268R.

Contact 288R1 of short range alarm relay 288R is coupled to a short range delay 306. The short range delay 306 includes a triode 308 with a resistor 310 and a capacitor 312 connected in parallel between the grid of tube 308 and the juncture between the resistors 297 and 299. The plate of tube 308 is directly connected with the plate of tube 292 and to the positive voltage source of 200 v.

Provided the sector enable relay 304R is actuated to close the circuit between contacts 304R1 and 304R3 thereof (which will be described later), closure of the circuits between contacts 268R1 and 268R3 of the long range alarm relay 268R feeds a positive voltage to the grid of tube 292 of the long range delay 290. The positive voltage applied to the grid of tube 292 charges the capacitor 296. When either the circuit between contacts 304R1 and 304R3 of the sector enable relay 304R or the circuit between the contacts 268R1 and 268R3 of the relay 268R again open, the positive voltage originally impressed on the grid of tube 292 is maintained by the charge on the capacitor 296. The closed circuit between contacts 307R1 and 307R3 of a relay 307R which is closed by the positive voltage applied to the grid of the tube 292 and which operates an alarm light 309 remains closed until the capacitor 296 discharges through the resistor 294. The time constant of the resistor 294 and capacitor 296 circuit is sufficiently long to keep the alarm light 309 energized for certain predetermined intervals.

The short range alarm circuit including the relay 288R, the short range delay 306, a relay 310R and a light 312 operates in substantially the same manner as the long range alarm circuit previously described with the exception that the short range relay 288R derives a positive voltage which is applied to the grid of the tube 308 only when the circuit between the contacts 268R1 and 268R3 of the long range alarm relay 268R is closed. In this way, the short range alarm light 312 can not be actuated unless the long range alarm is actuated.

The function of the delay relays 290 and 306 is to keep the warning lights 309 and 312 on, even when the radar antenna operates in a scanning mode. For instance, FIG. 4 shows the PPI display as a radar antenna swings through 360°. If the proposed aircraft course corresponds to zero degrees on the PPI, the only radar return which the pilot need be informed of lies in the comparatively short portion of the scanning interval between lines 60 and 62. Thus the present system need only interpret the return between said line 60 and 62 to inform one whether a proposed flight path is safe when said proposed flight path corresponds to zero degrees on the PPI display. If the alarm lights 309 and 312 are energized only when the shadow analysis of the radar return of the sector lying between lines 60 and 62 indicates danger, the lights would be blinking on and off at the radar scan rate. To prevent this action, the time delays 290 and 306 are inserted between the voltage comparator relays 268R and 288R and the relays 307R and 310R respectively which energize the alarm lights 309 and 312.

The function of the sector enable relay 304R is as follows. Because the radar antenna normally operates in a scanning mode through 360° (see the radar return depicted in FIG. 4), the alarm lights 309 and 312 must be enabled (permitted to light up) only when the radar antenna is in a position corresponding to the desired proposed aircraft direction of flight.

The function of insuring that the alarm lights 309 and 312 are actuated only for that portion of the radar return which is created by the obstacles lying in the intended path of the aircraft is accomplished by the sector enable relay 304R in conjunction with the following circuits, an antenna differential generator 314 (shown in FIG. 5), a zero set synchro 315 (shown in FIG. 5), a phase detector 316, a synchro control transformer 318, and a voltage comparator 320. A reference voltage source 322 supplies the antenna differential generator 314 through a zero set synchro 315 and the phase detector 316 with power.

The phase detector 316 includes a transformer 324, a duo-triode 326, a second transformer 328, three resistors 330, 332, and 334, two diodes 336 and 338, and a capacitor 340. The grid of one-half of the tube 326 is referenced to ground through a secondary winding of the transformer 324. The grid of the other half of the tube 326 is referenced to ground through a secondary winding of the transformer 324. The grid of the other half of the tube 326 is referenced to ground through the secondary winding of the transformer 328. The primary of said transformer 328 is connected to one phase of the three phase output of the antenna differential generator 314. The resistors 330 and 332 are connected in series between a negative voltage and ground. The diodes 336 and 338 are series connected between the common junction of the resistors 330 and 332 and the cathodes of the tube 326. The resistor 334 is in parallel connection with the series connected resistor 330 and diode 336 and the capacitor 340.

The voltage comparator 320 includes a duo-triode 342, a duo-triode 344, two diodes 346 and 348, and a capacitor 350. One grid of the duo-triode 342 is coupled to the resistor 334 of the phase detector 316. The other grid of the duo-triode 342 is coupled to the output of the synchro control transformer 318. The diode 348 and the capacitor 350 are connected to provide a rectifier and filtering circuit between the output of the transformer 318 and the second grid of the duo-triode 342. The plates of the duo-triode 342 are coupled to the grids of the duo-triode 344. In series between the plates of duo-triode 344 is the enable relay 304R and the diode 346.

The synchro transformer 318 has three input lines which connect it with the antenna differential generator 314 and two output lines which connect it to the voltage comparator 320. The antenna differential generator 314, the zero set synchro 315, the synchro control transformer 318, the phase detector 316, the voltage comparator 320, and the reference voltage source 322 operate as follows to insure that the portion of the radar return, such as that lying between lines 60 and 62 of FIG. 4, being analyzed by this terrain clearance adapter and capable of actuating the alarm lights 309 and 312, is that portion of said radar return which is created by the terrain lying along the proposed course of the aircraft. The reference voltage source 322 supplies the zero set synchro 315 and the primary winding of transformer 324 of the phase detector 316 with the same reference voltage. As is well known in the art, the zero set synchro 315 supplies the antenna differential generator 314 with three phase current. Based on this three phase current said antenna differential generator can supply three phase current to the synchro control transformer 318 which is indicative of the position of the antenna of radar 78, since said antenna is coupled by gears (see FIG. 5) to the movable core of said antenna differential generator. One phase of the three phase output of the antenna differential generator 314 is applied to the primary of the second transformer 328. The phase of the voltage developed by the secondary of transformer 324 is fixed due to the connection of the primary thereof to the voltage reference 322 while the phase of the voltage out of the transformer 328 reverses 180° with each half revolution of the radar antenna. Thus the voltage applied to the grids of the duo-triode 326 are in phase during one portion of each revolution of the radar antenna. As is readily apparent from FIG. 7, the individual triodes of the duo-triode 326 are operated as cathode followers with a common cathode load. This load is referenced to −200 volts. Provided that either of the control grids of the duo-triode are positive, the cathode potential also will be positive. Therefore, when the two grid signals are out of phase, the cathode potential is never negative because, at any instant, at least one of the control grids is not negative. When the voltages of the two transformers 324 and 328 are in phase, the grids go negative at the same time, and the cathode potential likewise goes negative. The cathode voltage can go negative to the value which exists at the common junction of resistors 332 and 330, whereupon diode 336 conducts and prevents a further decrease in voltage. The voltage appearing at the junction of the two diode 336 and 338 is preferably limited over a range between zero and approximately −6.5 volts. This voltage is filtered by the capacitor 340 and a relatively smooth D.C. voltage is thereby applied through the sector width control resistor 334 to one input of the duo-triode 342 of the voltage comparator 320.

The other input of the voltage comparator 320, i.e., the voltage applied to the second grid of the duo-triode 342, is obtained from the rotor of the synchro control transformer 318. The output of the synchro control transformer 318 which is derived from the input supplied thereto by the antenna differential generator 314 is rectified by the diode 348 and filtered by the capacitor 350 before reaching the second grid of the duo-triode 342. Because of the connection between duo-triodes 342 and 344, signals impressed upon the grids of duo-triode 342 affect the signals impressed upon the grids of duo-triode 344. Thus the voltage difference, if any, between the plates of duo-triode 344 is dependent upon the two inputs to the voltage comparator 320, one of which is from the phase detector 316 and the other from the synchro control transformer 318. When the right grid of the duo-triode 344 is more negative than the left grid thereof the plate voltage unbalance of said tube is of a polarity which actuates the sector enabling relay 304R to close the circuits between contacts 304R1 and 304R3 and between contacts 304R4 and 304R6 thereof. The diode 348 prevents the closure of said circuits of relay 304R when the unbalance is of the opposite polarity. Therefore, when the phase detector 316 produces a negative voltage (as the result of the antenna being in the correct half circle), and the synchro control transformer 318 produces a null (as the result of the antenna being aligned with the position established by the control transformer 318), the voltage comparator 320 actuates the sector enabling relay 304R.

It is thus readily apparent that the output of the synchro control transformer 318 can be made zero when the radar antenna 78 is aligned with the intended flight path of the aircraft. Without cross winds, the synchro control transformer 318 output is set for zero degrees drift, i.e., the output of the transformer is set to be zero when the radar antenna 78 is aligned with the center line of the aircraft. In this situation the center line of the aircraft indicates the intended flight path of the aircraft. With cross winds which produce a drift angle, the synchro control transformer 318 output is set to be zero when the radar antenna 78 corresponds to the drift angle, i.e., the output of the transformer is set to be zero when the radar antenna is aligned with the actual flight path of the aircraft. In this way the apparatus compensates for the difference between the aircraft heading and the actual aircraft flight path which is caused by the cross winds. For this reason the rotor of the synchro control transformer 318 is adjustable to give a zero output for antenna positions up to 45° to the right or the left of the centerline of the aircraft.

Figure 4:
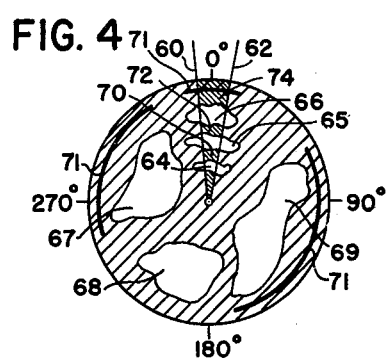
FIG. 4 illustrates "shadows" in a PPI display during a low level flight over hilly terrain.

In addition to the on-off type of alarm indicators 309 and 312, the invention herein described modifies the PPI display of the radar system in such a way that all alternate courses scanned by the antenna are displayed (see FIG. 4). Indications in this display as to whether or not the alternate courses are safe are generated by a marker generator 351 comprising a warning mark range generator 352 and a warning mark generator 370. The warning mark generator 370 is connected to the airborne radar 78 through the warning mark range generator 352. The warning mark range generator 352 includes principally a screen coupled monostable phanastron circuit with a pentode 354, a triode 356, a warn mark position resistor 358, two diodes 360 and 362, a capacitor 364, a triode 366, and a resistor 368. These various circuit elements are assembled to provide a circuit very similar to that of the range gate generator 146.

Coupled to one output of the warning mark range generator 352 is the warning mark generator 370. The warning mark generator 370 includes a triode 372, a capacitor 374 in series with a resistor 376, a warn mark width resistor 377, two diodes 378 and 380, a capacitor 382, a screen coupled monostable pentode 384, a triode 386, and a resistor 388. These particular elements are assembled in a phantastron circuit very similar to the circuit of the sampling gate generator 148. The output of the warning mark generator 370 is linked to contact 268R6 of the long range alarm relay 268R. Contact 268R4 of relay 268R is connected to one input of a two input "or" circuit 390. The output of the "or" circuit 390 is connected to a video mixer 392 of the radar system 78. The other input of the "or" circuit 390 is coupled to the output of the warning mark range generator 352 through contacts 304R4 and 304R6 of the enable relay 304R.

In operation the circuits of the warning mark range generator 352 and the warning mark generator 370 function in substantially the same manner as the range gate generator 146 and the sampling gate generator 148 previously described. More particularly, when a main radar pulse such as curve D of FIG. 9 is emitted by the radar 78, there is a video signal return like curve A. At the instant the main radar pulse, curve D, is transmitted by the radar 78, a radar synchronizing pulse is impressed upon tube 356. The output of tube 356 is coupled through the diodes 360 and 362 to the plate circuit of the pentode 354. As previously described in the operation of phantastron circuitry involving the pentode 152 the width of the pulse (see width 288 of screen voltage curve of FIG. 8) generated by a phantastron circuit such as that associated with pentode 354 is established by the voltage supplied through a resistor like 358 connected to a diode like 360. The length of this output pulse which is similar to portion 288 of the screen characteristic illustrated in FIG. 8 determines the distance from the center of the display (FIG. 4) of the airborne radar set 78 out to the marker lines 71. In the preferred embodiment of this invention, it is desired to keep the marker lines 71 close to the edge of the radar display. The output of the phantastron circuit of the pentode 354 is coupled to the video mixer 392 of the radar 78 through the cathode follower connected triode 366 and contacts 304R6 and 304R4 of the enable relay 304R to provide an indication like the portion of marker lines 71 between lines 60 and 62 of FIG. 4, of the sector being scanned.

At the same time the output of the phantastron circuit of the pentode 354 is also coupled to the warning mark generator 370. Due to the arrangement of the capacitor 374 and the resistor 376 this portion of the output signal is differentiated. Therefore the trailing edge thereof which coincides in time with the trailing edge of the signal coupled to contact 304R6 of the relay 304R is coupled through diodes 378 and 380 to the plate of the phantastron circuit of pentode 384. Like the sampling gate generator 148 the warning mark generator 370 is triggered by the trailing edge of the pulse generated by the preceding phantastron circuit of pentode 354. The width of the pulse emitted by phantastron circuit of the pentode 384 is controlled by the resistor 377. This pulse is used to modify the PPI display of the airbrone radar 78 in that the width of this pulse establishes the width of the warning marker lines 71.

The output of the phantastron circuit of pentode 384 is coupled to the grid of the cathode follower connected triode 386. The output of this cathode follower 386, in turn, is applied through contacts 268R6 and 268R4 of the long range alarm relay 268R to one input of the two input "or" circuit 390. The output of the "or" circuit 390 is fed directly to the video mixer 392 of the radar system 78 when the circuit between contacts 268R6 and 268R4 is closed. This is accomplished when the long range alarm relay 268R is actuated due to a dangerous object in the flight path of the aircraft as previously described. Thus, the warning mark lines 71 will appear on the PPI display (FIG. 4) of the airborne radar only upon a coincidence of warning mark pulses 71 from the warning mark generator 370 and the closure of the long range alarm relay 268.

The pulse output of the phantastron circuit of pentode 354 of the warning mark range generator 352 is coupled to the grid of the triode 366. This triode 366 feeds the other input of the "or" circuit 390 through contacts 304R4 and 304R6 of the sector enable relay 304R when the circuit between said contacts is closed. This circuit will be closed when the relay 304R is actuated. The manner in which said relay becomes actuated and remains so has been previously described. Thus only during the coincidence of a sector brightness pulse from warning mark range generator 352 and the closure of the circuit between contacts 304R4 and 304R6 will the pedestal or over-all brightness of the radar video signal be raised. The raising of the brightness of this signal portrays a bright wedge 396 of FIG. 4 on the PPI which corresponds to the sector being scanned at that particular moment.

A power supply 398 supplies the various voltages and currents necessary to operate the invention diagrammatically illustrated in FIGS. 6 and 7. More specifically, power source 398, a part of power supply 398, supplies the power necessary to actuate alarms 309 and 312. The various elements which compose the power supply 398 are well known in the art and therefore need not be discussed in any further detail.

Although the preferred embodiment of the invention disclosed herein refers to specific electrical equipment for obtaining intelligible information from radar return signals relative to the height of objects responsible for said return signals, it should be understood that the invention is in no way limited to the specific embodiment set forth herein.

What is claimed:

1. A terrain clearance system for use with an airborne radar set which can produce an "A" scope type of signal indicative of the radar shadow contained in the radar return received by said radar set comprising means for connection to said radar set, gating means for passing a predetermined segment of said radar return, means for integrating said passed portion of said radar return to provide a signal indicative of the amount of said radar shadow in said passed predetermined segment, and means for comparing said integrating means signal with a predetermined reference signal.

2. The combination set forth in claim 1 including an alarm means which is actuated when said integrating means signal differs from said predetermined signal.

3. A terrain clearance system for use with an airborne radar set which can produce an "A" scope type of signal indicative of the radar shadow contained in the radar return received by said radar set comprising means for connection to said radar set, a first gating means for passing a first predetermined segment of said radar return, a first means for integrating said first passed segment of said radar return to provide a first signal indicative of the amount of said radar shadow in said first passed predetermined segment, a second gating means for passing a second predetermined segment of said radar return, and a second means for integrating said second passed segment of said radar return to provide a second signal indicative of the amount of said radar shadow in said second passed predetermined segment.

4. The combination set forth in claim 3 including means for comparing said first and second signals with predetermined reference signals.

5. The combination set forth in claim 4 including an alarm means which is actuated when said second signal differs from the predetermined reference signal with which it is compared.

6. The combination set forth in claim 5 in which said alarm means is actuated when both said first and second signals exceed the predetermined reference signal with which they are compared.

7. A terrain clearance adapter for use with an airborne radar set which can produce an "A" scope type of signal indicative of the radar shadow contained in the radar return received by said radar set comprising means for connection to said radar set, means for taking a voltage slice out of said radar return which slice provides a voltage-time wave form, a portion of said wave form being representative of the amount of said radar shadow, gating means for passing a predetermined segment of said slice, integrating means for providing a second signal which second signal is indicative of the amount of said waveform portion which portion is representative of said amount of said radar shadow in said passed predetermined segment.

8. The combination set forth in claim 7 including means for comparing said second signal with a predetermined reference signal.

9. A terrain clearance system for use with an airborne radar set which can produce an "A" scope type of signal indicative of the radar shadow contained in the radar return received by said radar set comprising means for connection to said radar set, means for taking a slice out of said radar return which slice provides a time varying wave form, a portion of said wave form being representative of said radar shadow, a first gating means for producing a first signal, said first signal being representative of a first predetermined segment of said wave form, integrating means for producing a second signal, said second signal being indicative of the amount of said radar shadow in said first signal, a second gating means for producing at the conclusion of the producing of said first signal a third signal, said third signal being representative of a second predetermined segment of said wave form, and integrating means for producing a fourth signal, said fourth signal being indicative of the amount of said radar shadow in said third signal.

10. The combination set forth in claim 9 which includes a means for comparing said first signal with a first predetermined reference signal, another means for comparing said fourth signal with another predetermined reference signal, and an alarm means which is actuated when said fourth signal exceeds said second reference signal.

11. A terrain clearance system for use with an aircraft radar set, said radar set producing a received signal, said received signal having a characteristic thereof which is indicative of the amount of radar shadow cast by an obstacle in the path of a radar signal transmitted from said radar set, and means for providing a reference signal, said reference signal having a characteristic which is representative of a safe course with respect to said obstacle for the aircraft equipped with said radar set when said aircraft has approached to a point within a certain distance from said obstacle, whereby a comparison of said characteristics will indicate whether the aircraft is following a course that will avoid said obstacle.

12. The combination set forth in claim 11 including a second reference signal having a characteristic which is representative of a safe course when said aircraft has approached to a second point nearer to said obstacle than said first mentioned point, whereby successive comparisons may be made.

13. A terrain clearance system for use with an aircraft radar set, said radar set producing an "A" scope type of signal, said signal having portions thereof indicative of the presence of any obstacles in the path of a transmitted radar signal from said radar set and other portions indicative of the length of shadows cast by said obstacles, integrating means for deriving a voltage signal from said received signal in which the voltage of said derived signal varies in value in accordance with the length of each shadow, means for providing a reference voltage signal the value of said reference signal having been selected such that it appears to be a shadow cast by an obstacle that would be avoided by the aircraft within a prescribed flight range with respect to such an obstacle, and means for comparing said derived signal with said reference signal, to ascertain whether a safe course is being traversed by the aircraft equipped with said radar set when said aircraft is within said prescribed flight range in relation to an actual obstacle casting a shadow appearing in said "A" scope signal.

14. In combination with a device provided with a transmitter for transmitting a pulse signal and a receiver for receiving pulse signals which received pulse signals are reflected back from an obstacle in the path of the transmitted signal, said receiver producing a signal, said receiver produced signal having a portion thereof of one amplitude which is indicative of the presence of the obstacle and a second portion of another amplitude, said second portion having a width representative of the length of radar shadow cast by said obstacle, an obstacle warning system comprising a first slicer means for producing an electrical signal which electrical signal varies in magnitude at the beginning and end of said length of shadow, a gating means for producing a first signal, said first signal being indicative of a predetermined segment of said receiver produced signal, and integrating means for indicating the interval of time prevailing between that portion of said beginning and end of radar shadow which is produced by said gating producing means.

15. In combination with an airborne radar set provided with a transmitter for transmitting a pulse signal and a receiver for receiving pulse signals which received pulse signals are reflected back from an obstacle in the path of the transmitted signal, said receiver producing a signal, said receiver produced signal having a portion thereof of one amplitude which is indicative of the presence of the obstacle and a second portion of another amplitude, said second portion having a width representative of the length of radar shadow cast by said obstacle, a terrain clearance system comprising slicer means for producing an electrical signal which electrical signal varies in magnitude at the beginning and end of said width, gating means for producing a first signal, said first signal being representative of a predetermined portion of said receiver produced signal, integrating means for depicting the time span between the portion of the beginning and end of said width which portion of said width is contained in said predetermined portion of said first signal, and means for comparing said time span with a predetermined reference signal.

16. In combination with a radar set provided with a transmitter for transmitting pulse signals and a receiver for receiving pulse signals which received signals are reflected back from upwardly projecting obstacles and ground areas between said obstacles in the path of said transmitted signals, said receiver producing an output signal for each received signal, said output signal including therein various voltage portions having a first magnitude indicative of the presence of the obstacles, other voltage portions of a second magnitude having widths indicative of the respective lengths of radar shadows cast by said obstacles and additional voltage portions indicative of the ground areas beyond the respective radar shadows on the far side of the obstacles, a terrain clearance system comprising slicer means for producing a voltage pulse for each portion of second magnitude in said receiver output signal, said voltage pulse having a width proportional to the width of the second magnitude of voltage it represents, integrator means for producing a first signal, said first signal being representative of said produced voltage pulses of a predetermined segment of said receiver signal, and means for comparing said first representative signal with a predetermined reference signal.

17. In combination with an airborne radar set having a transmitter for transmitting a radar pulse, a receiver for receiving a return signal due to said transmitted pulse, said received signal having portions indicative of radar shadow, a terrain clearance system comprising means for connection to said radar set, a first gating means for passing a first predetermined segment of said received signal, a second gating means for passing a second predetermined segment of said received signal, integrating means for providing an indication of the amount of said radar shadow in said predetermined segments, means for comparing the amount of said radar shadow in said first and second predetermined segments with first and second predetermined reference signals respectively, a first alarm means which is actuated when said amount of said radar shadow in said first predetermined segment exceeds said first reference signal and when said amount of said radar shadow in said second predetermined segment exceeds said second reference signal, and a second alarm means which is actuated when said amount of said radar shadow in said second predetermined segment exceeds said second reference signal.

18. In combination with an airborne radar set having a transmitter for transmitting a radar pulse, a receiver for receiving a return signal due to said transmitted pulse, said return signal containing portions indicative of radar shadow, and a rotating antenna electrically connected to said transmitter and receiver, a terrain clearance system comprising means for connection to said radar set, gating means for passing a predetermined segment of said received signal, integrating means for providing an indication of the amount of said radar shadow in said predetermined segment, means for comparing the amount of said radar shadow in said predetermined segment with a predetermined reference signal, an alarm means which is actuated when enabled and when said amount of said radar shadow in said predetermined segment exceeds said reference signal, position indicating means linked to said rotating antenna, said position indicating means for providing a second signal which is indicative of the position of said antenna at any given time, and means associated with said position indicating means which enables said alarm means when said antenna is in a predetermined position.

19. In combination with an airborne radar set having a transmitter for transmitting a radar pulse, a receiver for receiving a return signal due to said transmitted pulse, said return signal containing portions indicative of radar shadow, and a rotating antenna electrically connected to said transmitter and receiver, a terrain clearance system comprising means for connection to said radar set, gating means for passing a predetermined segment of said received signal, integrating means for providing an indication of the amount of said radar shadow in said predetermined segment, means for comparing the amount of said radar shadow in said predetermined segment with a predetermined reference signal, an alarm means which is actuated when enabled and when said amount of said radar shadow in said predetermined segment exceeds said reference signal, position indicating means linked to said rotating antenna, said position indicating means for providing a second signal which is indicative of the position of said antenna at any given time, means associated with said position indicating means which enables said alarm means when said antenna is in a predetermined position, and means for producing a marker line on said radar display, said marker line being indicative of the direction said rotating antenna is pointing in whenever said amount of said radar shadow in said predetermined segment exceeds said reference signal.

20. In combination with an airborne radar set having a transmitter for transmitting a radar pulse, a receiver for receiving a return signal due to said transmitted pulse, said return signal having portions indicative of radar shadow, and a rotating antenna electrically connected to said transmitter and receiver, a terrain clearance system comprising means for connection to said radar set, gating means for passing a predetermined segment of said received signal, integrating means for providing an indication of the amount of said radar shadow in said predetermined segment, means for comparing the amount of said radar shadow in said predetermined segment with a predetermined reference signal, position indicating means linked to said rotating antenna, said position indicating means for providing a second signal which is indicative of the position of said antenna at any given time, means for producing a marker line on said radar display, said marker line being indicative of the direction said rotating antenna is pointing in whenever said amount of said radar shadow in said predetermined segment exceeds said reference signal.

21. In combination with an airborne radar set having a transmitter for transmitting a radar pulse, a receiver for receiving a return signal due to said transmitted pulse, said return signal having portions thereof indicative of radar shadow, and a rotating antenna electrically connected to said transmitter and receiver, and a radar display electrically linked to said receiver, a terrain clearance system comprising means for connection to said radar set, a first gating means for passing a predetermined segment of said received signal, integrating means for providing an indication of the amount of said radar shadow in said predetermined segment, means for comparing the amount of said radar shadow in said predetermined segment with a predetermined reference signal, an alarm means which is actuated when enabled and when said amount of said radar shadow in said predetermined segment exceeds said reference signal, position indicating means linked to said rotating antenna, said position indicating means for providing a second signal which is indicative of the position of said antenna at any given time, means associated with said position indicating means which associated means enables said alarm means when said antenna is in a predetermined position, and means for raising the over-all brightness of a sector of said radar display when said alarm means is enabled, said sector being indicative of the sector then being scanned by said rotating antenna.

22. In combination with an airborne radar set having a transmitter for transmitting a radar pulse, a receiver for receiving a return signal due to said transmitted pulse, said return signal containing portions indicative of radar shadow caused by upstanding obstacle in the path of said transmitted radar pulse, a rotating antenna electrically connected to said transmitter and receiver, and a radar display electrically linked to said receiver, a terrain clearance system comprising means for connection to said radar set, a first gating means for passing a first predetermined segment of said received signal, a second gating means for passing a second predetermined segment of said received signal, integrating means for providing an indication of the amount of said radar shadow in said predetermined segments, means for comparing the amount of said radar shadow in said first and second predetermined segments with first and second predetermined reference signals respectively, a first alarm means which is actuated when enabled and when said amount of said radar shadow in said first predetermined segment exceeds said first reference signal and when said amount of said radar shadow in said second predetermined segment exceeds said second reference signal, a second alarm means which is actuated when enabled and when said amount of said radar shadow in said second predetermined segment exceeds said second reference signal, position indicating means linked to said rotating antenna, said position indicating means for providing a second signal which is indicative of the position of said antenna at any given time, switch means associated with said position indicating means which enables said first and second alarm means when said antenna is in a predetermined position, means for producing a marker line on said radar display, said marker line being indicative of the direction said rotating antenna is pointing in whenever said amount of said radar shadow in said second predetermined segment exceeds said second reference signal, and means for raising the over-all brightness of a sector of said radar display when said first and second alarm means are enabled, said sector being indicative of the sector then being scanned by said rotating antenna.

23. A terrain clearance system for use with an airborne radar set which can produce a signal indicative of the radar shadow contained in the radar return received by said radar set comprising means for connection to said radar set, gating means for passing a predetermined segment of said radar return and for blocking radar return from distances beyond a predetermined distance, means for providing a signal indicative of the amount of said radar shadow in said passed predetermined segment, and means for comparing said shadow indication signal with a predetermined reference signal.

References Cited in the file of this patent

UNITED STATES PATENTS 3,086,200     Altermann  ------------ Apr. 16, 1963